United States Patent
Zhang

(10) Patent No.: US 12,477,624 B2
(45) Date of Patent: Nov. 18, 2025

(54) MULTIMEDIA BROADCAST MULTICAST SERVICE TRANSMISSION METHOD, APPARATUS, DEVICE, AND STORAGE MEDIUM

(71) Applicant: Datang Mobile Communications Equipment Co., Ltd., Beijing (CN)

(72) Inventor: Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 481 days.

(21) Appl. No.: 18/040,974

(22) PCT Filed: Aug. 6, 2021

(86) PCT No.: PCT/CN2021/111349
§ 371 (c)(1),
(2) Date: Feb. 7, 2023

(87) PCT Pub. No.: WO2022/028612
PCT Pub. Date: Feb. 10, 2022

(65) Prior Publication Data
US 2023/0269829 A1    Aug. 24, 2023

(30) Foreign Application Priority Data
Aug. 7, 2020   (CN) .................. 202010790282.5

(51) Int. Cl.
*H04W 76/40* (2018.01)
*H04W 4/06* (2009.01)
*H04W 76/10* (2018.01)

(52) U.S. Cl.
CPC ............. *H04W 76/40* (2018.02); *H04W 4/06* (2013.01); *H04W 76/10* (2018.02)

(58) Field of Classification Search
CPC ....... H04W 76/40; H04W 4/06; H04W 76/10; H04W 76/27
See application file for complete search history.

(56) References Cited

U.S. PATENT DOCUMENTS

| 9,860,715 B2 * | 1/2018 | Han ...................... H04W 76/40 |
| 2005/0083913 A1 * | 4/2005 | Choi ..................... H04W 76/40 370/352 |

(Continued)

FOREIGN PATENT DOCUMENTS

| CN | 102340735 A | 2/2012 |
| CN | 102378113 A | 3/2012 |

(Continued)

OTHER PUBLICATIONS

European Patent Office, Extended European Search Report Issued in Application No. 21852667.1, Nov. 10, 2023, Germany, 9 pages.

(Continued)

*Primary Examiner* — Afshawn M Towfighi
(74) *Attorney, Agent, or Firm* — KILPATRICK TOWNSEND & STOCKTON LLP

(57) ABSTRACT

The present application provides a multimedia broadcast multicast service transmission method, including: a core network device determines a target terminal which is interested in a target MBMS; the core network device determines a cell associated with the target terminal; the core network device sends first information to an access network device to which the cell associated with the target terminal belongs, the first information is used to trigger the access network device to confirm whether the target MBMS needs to be received; establishes a broadcast connection with the access network device for the target MBMS, if second information from the access network device or the target terminal is received by the core network device, the second information (Continued)

is used to indicate the access network device needs to receive the target MBMS.

20 Claims, 9 Drawing Sheets

(56) References Cited

U.S. PATENT DOCUMENTS

2016/0249266 A1* 8/2016 Kim .................. H04W 4/06
2019/0230564 A1* 7/2019 Kim .................. H04W 4/06

FOREIGN PATENT DOCUMENTS

| CN | 102687540 A | 9/2012 |
| CN | 109417682 A | 3/2019 |
| WO | 2014166071 A1 | 10/2014 |

OTHER PUBLICATIONS

Hytera Communications Corp., "Dynamic Configuration of MBSFN areas for MC service", 3GPP TSG-RAN WG2 Meeting #98, Hangzhou, China, May 15-19, 2017, total 4 pages, R2-1705086.

International Search Report and Written Opinion received in the corresponding International Application PCT/CN2021/111349, mailed Oct. 28, 2021.

First Office Action received in the corresponding Chinese Application 202010790282.5, mailed Jun. 6, 2022.

Second Office Action received in the corresponding Chinese Application 202010790282.5, mailed Aug. 24, 2022.

Decision on Rejection received in the corresponding Chinese Application 202010790282.5, mailed Dec. 12, 2022.

Ericsson "KI #1, Sol #2: Solution 2 update", SA WG2 Meeting #139E S2-2004700, Jun. 12, 2020.

3GPP TR 26.925 V0.4.0 (Jul. 2019), 3rd Generation Partnership Project; Technical Specification Group SA WG4 Typical traffic characteristics of media services on 3GPP networks; (Release 16).

* cited by examiner

MULTIMEDIA BROADCAST MULTICAST SERVICE TRANSMISSION METHOD, APPARATUS, DEVICE, AND STORAGE MEDIUM

CROSS-REFERENCE TO RELATED APPLICATIONS

The present application is a national stage of International Application No. PCT/CN2021/111349, filed on Aug. 6, 2021, which claims priority to Chinese Patent Application No. 202010790282.5, filed on Aug. 7, 2020. The disclosures of the aforementioned applications are hereby incorporated by reference in their entireties.

FIELD

The present application relates to the field of communications and, in particular, to a multimedia broadcast multicast service transmission method, an apparatus, a device, and a storage medium.

BACKGROUND

Multimedia broadcast multicast service (MBMS) was proposed by the 3rd generation partnership (3GPP) project. The service is a technology that a data source sends data to multiple terminal devices, which can improve a utilization efficiency of network resources (especially air interfaces). The MBMS technology only allows the core network device to initiate a multicast broadcast service (MBS) session start process to a target cell or an access network device that has been statically planned in advance, and a transmission of the MBMS is limited and a utilization efficiency of network resources is not high.

SUMMARY

The present application provides a multimedia broadcast multicast service transmission method, an apparatus, a device, and a storage medium, which is used to solve the problems of the transmission of the MBMS is limited and the utilization efficiency of the network resources is not high.

In one embodiment of the present application provides a multimedia broadcast multicast service transmission method, including:
  determining, by a core network device, a target terminal which is interested in a target multimedia broadcast multicast service MBMS;
  determining, by the core network device, a cell associated with the target terminal;
  sending, by the core network device, first information to an access network device to which the cell belongs, where the first information is used to trigger the access network device to confirm whether the target MBMS needs to be received; and
  establishing, by the core network device, a broadcast connection with the access network device for the target MBMS if second information from the access network device or the target terminal is received, where the second information is used to indicate the access network device needs to receive the target MBMS.

In one embodiment of the present application provides a multimedia broadcast multicast service transmission method, the method includes:
  receiving, by an access network device, first information from a core network device, where the first information is used to trigger the access network device to which a cell associated with a target terminal belongs to confirm whether a target MBMS needs to be received, and the target terminal is a terminal device interested in the target MBMS;
  paging, by the access network device, in response to the first information, the target terminal in an idle state and/or the target terminal in an in-active state for the target MBMS within a cell under a jurisdiction of the access network device; and
  returning, by the access network device, second information to the core network device if it is determined, according to a situation about a paging response of the target terminal to the access network device, that the target MBMS needs to be received, where the second information is used to indicate that the access network device needs to receive the target MBMS.

In one embodiment of the present application provides a core network device, including a memory, a transceiver and a processor:
  the memory is configured to store computer programs;
  the transceiver is configured to receive and transmit data under a control of the processor;
  the processor is configured to read the computer programs in the memory and execute the following operations:
  determining a target terminal which is interested in a target multimedia broadcast multicast service MBMS;
  determining a cell associated with the target terminal;
  sending first information to an access network device to which the cell belongs, where the first information is used to trigger the access network device to confirm whether the target MBMS needs to be received; and
  establishing a broadcast connection with the access network device for the target MBMS if second information from the access network device or the target terminal is received, where the second information is used to indicate the access network device needs to receive the target MBMS.

In one embodiment of the present application provides an access network device, including a memory, a transceiver and a processor:
  the memory is configured to store computer programs;
  the transceiver is configured to receive and transmit data under a control of the processor;
  the processor is configured to read the computer programs in the memory and execute the following operations:
  receiving first information from a core network device, where the first information is used to trigger the access network device to which a cell associated to a target terminal belongs to confirm whether it needs to receive a target MBMS, and the target terminal is a terminal device interested in the target MBMS;
  paging, in response to the first information, the target terminal in an idle state and/or the target terminal in an in-active state for the target MBMS within a cell under a jurisdiction of the access network device; and
  returning second information to the core network device if it is determined, according to a situation about a paging response of the target terminal to the access network device, that the target MBMS needs to be received, where the second information is used to indicate that the access network device needs to receive the target MBMS.

In one embodiment of the present application provides a multimedia broadcast multicast service transmission apparatus, including:

a determining unit, configured to determine a target terminal which is interested in a target multimedia broadcast multicast service MBMS, and determine a cell associated with the target terminal;

a communication unit, configured to send first information to an access network device to which the cell belongs, where the first information is used to trigger the access network device to confirm whether the target MBMS needs to be received; and a connection unit, configured to establish a broadcast connection with the access network device for the target MBMS if second information from the access network device or the target terminal is received, where the second information is used to indicate the access network device needs to receive the target MBMS.

In one embodiment of the present application provides a multimedia broadcast multicast service transmission apparatus, including:

a communication device, configured to receive first information from a core network device, where the first information is used to trigger the access network device to which a cell associated to a target terminal belongs to confirm whether it needs to receive a target MBMS, and the target terminal is a terminal device interested in the target MBMS;

a paging device, configured to page, in response to the first information, the target terminal in an idle state and/or the target terminal in an in-active state for the target MBMS within a cell under a jurisdiction of the access network device; and the communication device is further configured to return second information to the core network device if it is determined, according to a situation about a paging response of the target terminal to the access network device, that the target MBMS needs to be received, where the second information is used to indicate that the access network device needs to receive the target MBMS.

In one embodiment of the present application provides a processor readable storage medium, having computer program stored thereon, the computer program is used to enable a processor to execute the method as described in the embodiments.

In one embodiment of the present application provides a computer program product containing instructions that, when executed on a computer, enable the computer to execute the method as described in the embodiments.

In one embodiment of the present application provides a communication system, including a core network device as described in the third aspect, an access network device as described in the embodiments.

The present application provides a multimedia broadcast multicast service transmission method and apparatus. A core network device determines a target terminal which is interested in a target MBMS, determines a cell associated with the target terminal, sends first information to an access network device to which the cell associated with the target terminal belongs, the first information is used to trigger the access network device to confirm whether the target MBMS needs to be received, establishes a broadcast connection with the access network device for the target MBMS, if second information from the access network device or the target terminal is received by the core network device, the second information is used to indicate the access network device needs to receive the target MBMS.

It should be understood that the content described in the above summary section is not intended to limit the key or important features of the embodiments of the present disclosure, nor is it intended to limit the scope of the present disclosure. Other features of the present disclosure will become apparent from the following description.

BRIEF DESCRIPTION OF DRAWINGS

In order to explain the present embodiments more clearly, the drawings to be used in the embodiments or the description of the prior art will be introduced briefly in the following. The drawings in the following description are some embodiments of the present disclosure.

DESCRIPTION OF EMBODIMENTS

In the present application, "at least one" means one or more, "multiple" means two or more. "And/or", which describes an association relationship of associated objects, represents that there may be three kinds of relationships, for example, A and/or B, it can represent that A exists alone, A and B exist at the same time, and B exists alone, where A, B may be singular or plural. The character "I" generally represents that the associated objects before and after the character are in an "or" relationship. "At least one item below" or similar expressions thereof refer to any combination of these items, including any combination of single item or plural items. For example, at least one item of a, b, or c may represent: a, b, c, a-b, a-c, b-c, or a-b-c, where a, b, c may be a single or multiple.

It can be understood that the steps or operations in the embodiments of the present application are only examples, the embodiments of the present application may also perform other operations or variations of various operations. In addition, various steps may be performed in different orders presented in the embodiments of the present application, and may not be required to perform all the operations in the embodiments of the present application.

The embodiments of the present application will be clearly and completely described in the following with reference to the accompanying drawings in the embodiments of the present application. The described embodiments are part of the embodiments of the present application, not all embodiments.

The embodiments of the present application may be applied to various communication systems, especially 5G systems. For example, a suitable communication system may be a global system of mobile communication (GSM) system, a code division multiple access (CDMA) system, a wideband code division multiple access (WCDMA), a general packet radio service (GPRS) system, a long term evolution (LTE) system, a LTE frequency division duplex (FDD) system, a LTE time division duplex (TDD) system, a long term evolution advanced (LTE-A) system, an universal mobile telecommunication system (UMTS), a worldwide interoperability for microwave access (WiMAX) system, a 5G new radio (NR) system, etc. These various systems include terminal devices and network devices. The system may also include a core network part, such as an evolved packet system (EPS), a 5G system (5GS), and the like.

The communication system to which the embodiments of the present application are applicable includes a network device and a terminal device. The network device may include an access network device and a core network device. The access network device may be, for example, a radio access network device.

Figure 1:
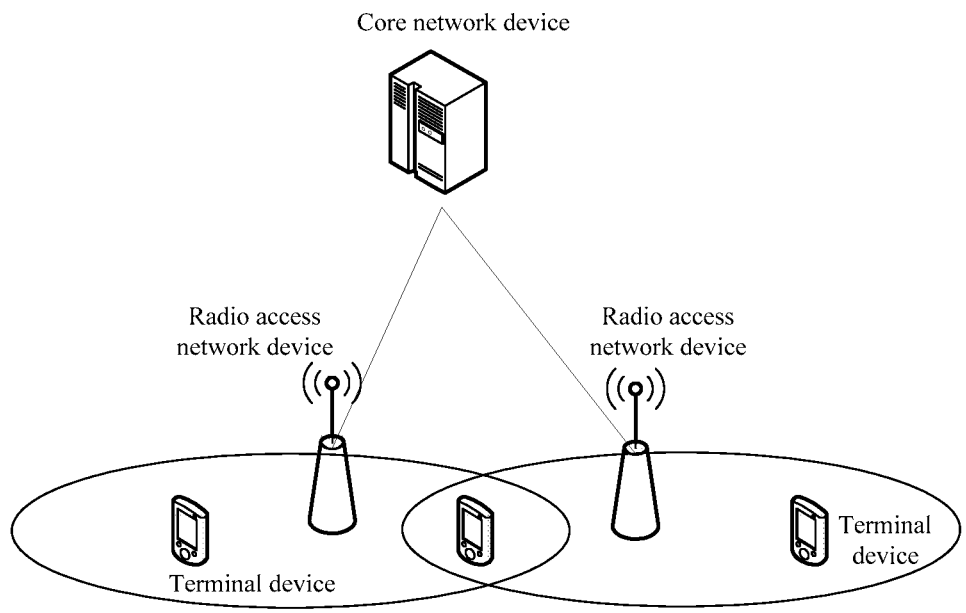
FIG. 1 is a schematic diagram of an application scenario according to an embodiment of the present application.

FIG. 1 is a schematic diagram of an application scenario according to an embodiment of the present application. As shown in FIG. 1, a communication system includes a network device and a terminal device, and the network device may include a radio access network device and a core network device. The terminal device is connected with the radio access network device in a wireless manner, the radio access network device is connected with the core network device in a wireless or wire manner. The core network device and the radio access network device may be independent and different physical devices, or functions of the core network device and logical functions of the radio access network device may be integrated on the same physical device, or functions of some core network device and functions of some radio access network devices are integrated on one physical device. The terminal device may be fixed or movable. FIG. 1 is only a schematic diagram, the communication system may also include other network devices, such as a wireless relay device and a wireless backhaul device, which are not shown in FIG. 1. The number of core network devices, radio access network devices, and terminal devices in the communication system are not limited in the embodiments of the present application. It should be noted that, the two radio access network devices shown in FIG. 1 may be connected to the same core network device, or may be connected to different core network devices.

Hereinafter, some terms in the present application will be illustrated and to facilitate the understanding:

Core network (CN) device: may refer to an access and mobility management function (AMF) entity, or a session management function (SMF) entity, or a mobility management entity (MME) or other core network devices.

Access network (AN) device: for example, a radio access network (RAN) device, which is a device that accesses a terminal device to a wireless network, which may be an evolutional base station (evolutional Node B, eNB or eNodeB) in a long term evolution (long term evolution, LTE), or a relay station or an access point, or 5G base station (gNB) in 5G network architecture (next generation system), or a home evolved base station (HeNB), a relay node (relay node), a home base station (femto), a pico base station (pico), etc., which are not limited herein. In a possible way, the radio access network device may be a base station (such as a gNB) of a centralized unit (CU) and a separate architecture of a distributed unit (DU), the CU and DU may also be separated geographically.

Terminal device: it may be a wireless terminal or a wired terminal. The wireless terminal may refer to a device with wireless transceiver function, which may be deployed on a land, including indoor or outdoor, handheld or vehicle-mounted; it may also be deployed on water (such as ships, etc.); it may also be deployed in an air (such as on airplanes, balloons, satellites, etc.). The terminal device may be a mobile phone, a tablet computer (Pad), a computer with wireless transceiver function, a virtual reality (VR) terminal, an augmented reality (AR) terminal, the wireless terminal in an industrial control (industrial control), the wireless terminal in self driving, the wireless terminal in a remote medical, the wireless terminal in a smart grid, the wireless terminal in a transportation safety, the wireless terminal in a smart city, the wireless terminal in a smart home, and the like, which are not limited herein. It can be understood that, in the embodiment of the present application, the terminal device may also be referred to as a user equipment (UE). Where one or more antennas may be used between the terminal device and the RAN to perform a multiple input multiple output (MIMO) transmission, the MIMO transmission may be a single user MIMO (SU-MIMO) or a multiple user MIMO (MU-MIMO). According to a form and the number of root antenna combinations, the MIMO transmission may be 2D-MIMO, 3D-MIMO, FD-MIMO, or massive-MIMO, or may be a diversity transmission, a precoding transmission, or a beamforming transmission, etc.

Multimedia broadcast multicast service (MBMS): refers to a technology of sending broadcast data or multicast data from one data source to multiple terminal devices, which can improve a utilization efficiency of network resources (especially air interfaces).

In a MBMS technology, when a multicast broadcast service (MBS) session starts, the core network device sends a session start request message to the access network device to notify the access network device that an MBS session is about to start, and requests to establish a bearer network for transmitting the MBS session with the access network device at the same time. However, the core network device may only send the MBS session start request message to a target cell or a target access network device that has been statically set in advance. It does not fully consider that a location of the terminal device may change, resulting in limited MBMS transmission and a low utilization efficiency of network resources, to result in a poor transmission effect of the MBMS. Where one access network device can manage or govern one or more cells, a cell herein refers to a geographic area or a partially geographic area covered by one access network device, such as a cellular cell, and the terminal device in the cell may communicate with the access network device to which the cell belongs.

Figure 2:
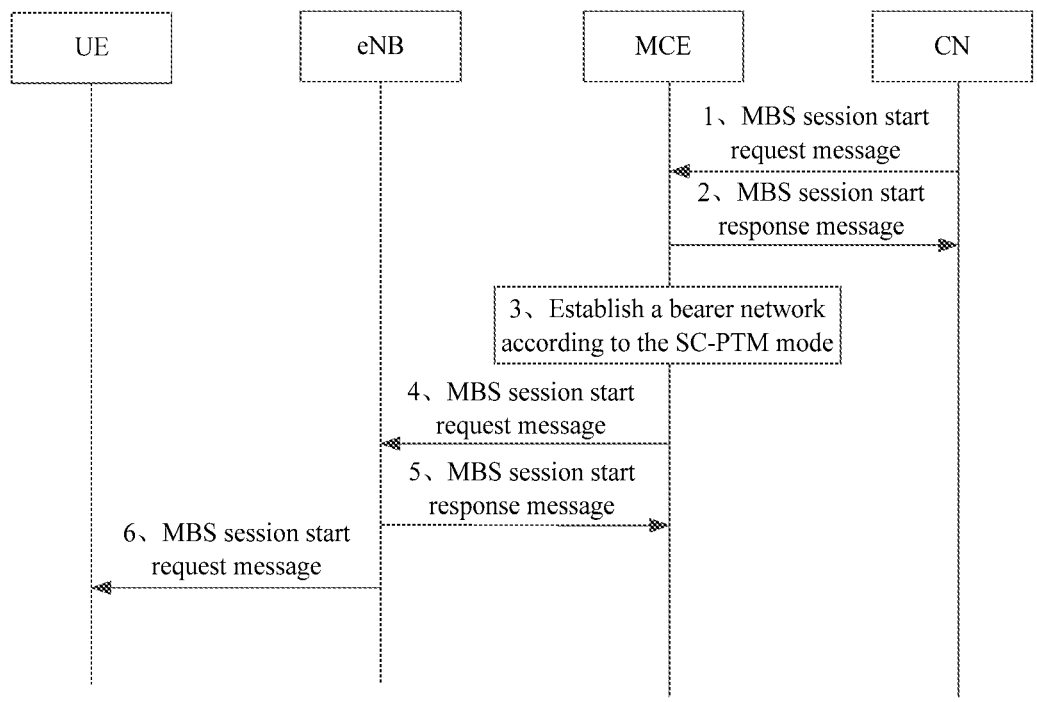
FIG. 2 is an exemplary flowchart of a SC-PTM mode transmission of a MBMS according to an embodiment of the present application.

FIG. 2 is an exemplary flowchart of a single cell-point to multipoint (SC-PTM) mode transmission of a MBMS. As shown in FIG. 2, a multi-cell/multicast coordination entity (MCE) belongs to a logical node in a radio access network, the MCE can control one or more eNBs. When an MBS session starts, a CN device sends an MBS session start request message to the MCE that has been statically planned in advance, the MCE returns an MBS session start response message to the CN device, and establishes a bearer network according to the SC-PTM mode. The MCE sends the MBS session start request message to the eNB, after the MBS session request message is received, the eNB returns the MBS session start response message to the MCE, and triggers the SC-PTM mode with a UE to establish a bearer network of the SC-PTM mode with the UE. After the above communication connection is established, the UE interested in the MBMS acquires scheduling information of a single cell MBMS traffic channel (SC-MTCH) by reading single cell multicast control channel (SC-MCCH) information, and receives the MBMS in an idle (Idle) state or a connected (connected) state according to the scheduling information. It can be seen that, in the MBMS transmission process shown in FIG. 2, the MCE for receiving the MBS session start request message needs to be statically set in advance, resulting in limited MBMS transmission and a low utilization efficiency of network resources.

Figure 3:
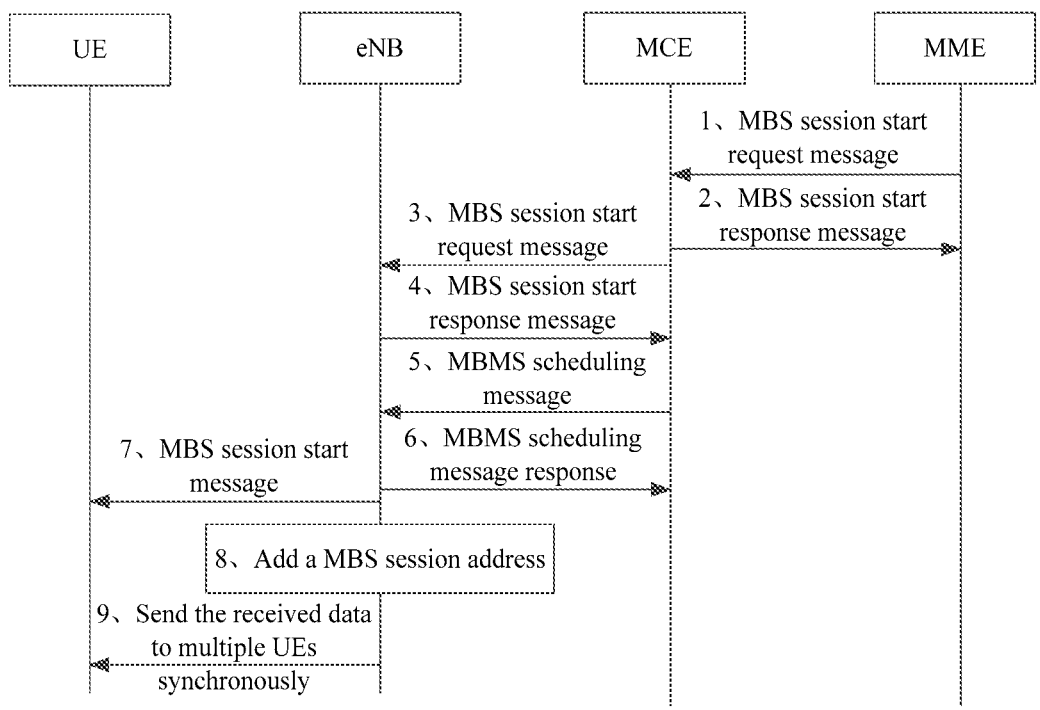
FIG. 3 is an exemplary flowchart of another transmission solution of a MBMS according to an embodiment of the present application.

FIG. 3 is an exemplary flowchart of another transmission solution of a MBMS. As shown in FIG. 3, a mobility management entity (MME) is a control node in a radio access network, and is responsible for processes such as positioning and paging of the UE in an idle state. When an MBS session starts, an MME sends an MBS session start request message to the MCE, the MCE returns the MBS session start response message to the MME, and sends the MBS session start request message to the eNB. After the MBS session start response message from the eNB is received, the MCE sends MBMS scheduling message to the eNB. The eNB returns the MBMS scheduling message response to the MCE when receiving the MBMS scheduling message, notifies the UE of the MBS session start, and adds an MBS session address to receive user plane data at the same time, and sends the received data to multiple UEs synchronously. It can be seen that a MBMS transmission process shown in FIG. 3 is triggered by the MBS session start request message from the MCE and the MBMS scheduling message to trigger the eNB to establish the MBMS transmission mechanism for the UE. The eNB also needs to be statically set in advance to receive the MBS session start request message and the MBMS scheduling message of the MCE, resulting in limited MBMS transmission and a low utilization efficiency of network resources.

For a flexible expression, a session or a MBMS session or a target MBMS session presented subsequently has the same meaning as the above-mentioned MBS session.

To solve the above problems, embodiments of the present application provide a multimedia broadcast multicast service transmission method, an apparatus, a device, and a storage medium. In the multimedia broadcast multicast service transmission method provided by the embodiment of the present application, in a transmission process of a target MBMS, the core network device determines a target terminal which is interested in the target MBMS, determines a cell associated with the target terminal, sends first information to an access network device to which the cell belongs, where the first information is used to trigger the access network device to confirm whether the target MBMS needs to be received, establishes a broadcast connection with the access network device for the target MBMS, if second information from the access network device or the target terminal indicating that the access network device needs to receive the target MBMS is received. Thus, the core network device establishes the broadcast connection with the access network device that actually needs to receive the target MBMS, instead of establishing the broadcast connection with a statically set fixed access network device every time the MBMS transmission is performed. Therefore, an actual requirement of the access network device for the target MBMS is fully considered in transmission of the target MBMS, which effectively improves a transmission flexibility of the MBMS, improves the a utilization efficiency of network resources, and a transmission effect of the MBMS is effectively improved. The methods and apparatuses provided in the embodiments of the present application are based on the same application concept. Since principles for the methods and apparatuses solving problems are similar, the implementations of the apparatuses and methods can be referred to each other, and repetition will not be repeated here.

Figure 4:
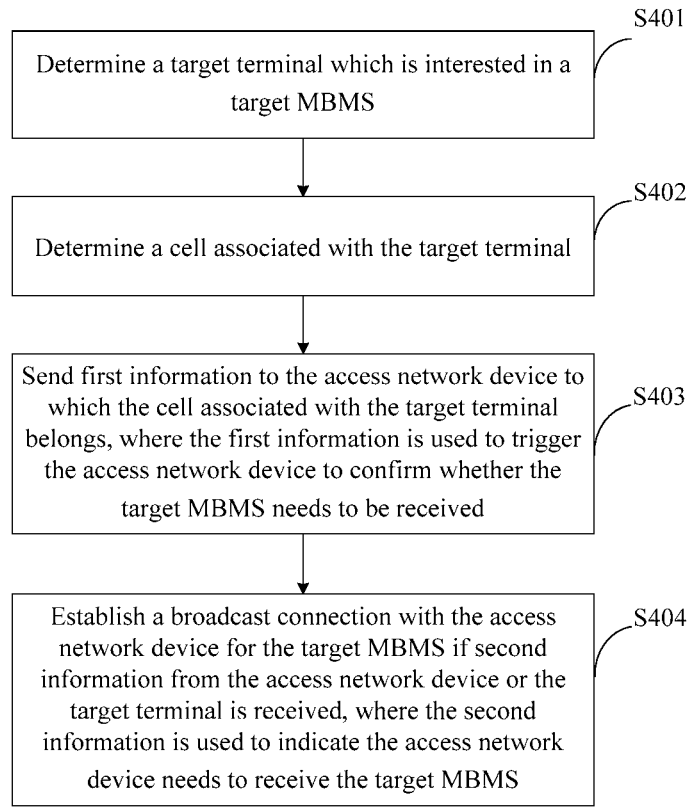
FIG. 4 is a flowchart of a multimedia broadcast multicast service transmission method according to an embodiment of the present application.

FIG. 4 is a schematic flowchart of a multimedia broadcast multicast service transmission method according to an embodiment of the present application. The method in the embodiment may be executed by the above-mentioned core network device side. As shown in FIG. 4, the method of the embodiment may include the following steps.

S401, determine a target terminal which is interested in a target MBMS.

In the embodiment, when the core network device receives the target MBMS, the target terminal which is interested in the target MBMS may be determined according to a preset corresponding relationship between a terminal device and the MBMS stored in advance. In the preset corresponding relationship between the terminal device and the MBMS, the terminal device corresponding to the target MBMS is the target terminal which is interested in the target MBMS.

In a possible implementation, the core network device receives third information from a SMF entity, where the third information is used to indicate a session start of the target MBMS. In a case of the third information indicating the session start of the target MBMS is received, the core network device determines the target terminal which is interested in the target MBMS, and to trigger the core network device to transmit the target MBMS by the receiving of the third information.

In an implementation, the third information includes an identifier of the target MBMS. In a possible implementation, the terminal device corresponding to the identifier of the target MBMS is found, according to the preset corresponding relationship between the terminal device and the MBMS and the identifier of the target MBMS in the third information, in a preset corresponding relationship between the terminal device and the MBMS to obtain the terminal device corresponding to the target MBMS, i.e., the target terminal which is interested in the target MBMS. In addition, the identifier of the target MBMS may include a service identifier and/or a session identifier of the target MBMS, where the service identifier of the target MBMS is unique, the target MBMS may include one or more sessions, each session having a unique session identifier.

In an implementation, the core network device may receive the target MBMS through an AMF entity, the AMF entity determines the target terminal which is interested in the target MBMS when the target MBMS is received.

In an implementation, the AMF entity may receive a session start message from the SMF entity, where the session start message includes the third information. In addition, the AMF entity may also receive session start messages from other entities like the SMF entity.

In an implementation, the third information may further include quality of service (QOS), multicast address and other information, so that the core network device and the access network device may also establish a broadcast connection according to the third information.

S402, determine a cell associated with the target terminal.

In the embodiment, for a target terminal that is in a connected state with a core network device, when the target MBMS is received by the core network device, the access network device to which the target terminal in the connected state is connected can be determined directly, and these access network devices are access network devices that need to receive the target MBMS is determined, so a session start request of the target MBMS can be sent to the access network device connected to the target terminal in the connected state directly, and to realize a transmission of the target MBMS.

In the embodiment, for a target terminal in an idle state or an in-active state, the core network device cannot accurately know the cell where the target terminal is located, and cannot accurately know the access network to which the target terminal is connected or will be connected, let alone determine whether these access network devices need to receive the target MBMS. Therefore, for the target terminal that is in the idle state or in the in-active state with the core network device, after the target terminal is determined, the core network device may determine the cell where the target terminal may be located, and determine the cell where the target terminal may be located as the cell associated with the target terminal. For example, the cell where the target terminal may be located may be determined by a historical activity track, a historical activity range or a historical geographical location, etc., of the target terminal.

The connected state, the idle state and the in-active state may be referred to as a connected mode, an idle mode and an in-active mode, respectively. In the connected state, the target terminal maintains communication with the core network device through a radio access network device, an amount of data transmitted to each other is large and a power consumption is high, the core network device may obtain the cell where the target terminal is located in a real time through the radio access network device; in the idle state, the target terminal is disconnected from the radio access network, neither the core network device nor the radio access network device can know the cell where the target terminal is located; in the in-active state, the target terminal is connected to the radio access network, but not connected to the core network device, the target terminal only retains part of a radio access network context, and the radio access network only retains part of a target terminal context, the cell where the target terminal is located could not be acquired accurately, when being paged, the target terminal can quickly transfer from the in-active state to the connected state.

S403, send first information to the access network device to which the cell associated with the target terminal belongs, where the first information is used to trigger the access network device to confirm whether the target MBMS needs to be received.

In the embodiment of the present application, after determining the cell associated with the target terminal, the core network device may send the first information to the access network device to which the cell associated with the target terminal belongs, where the first information is used to trigger the access network device to confirm whether the target MBMS needs to be received. The first information may include the target MBMS and the cell associated with the target terminal. For example, the first information includes an identifier (service identifier and/or session identifier) of the target MBMS and the cell associated with the target terminal. The identifier of the target MBMS may be a single identifier or an identifier list composed of multiple identifiers, the cell associated with the target terminal may be a single cell or a cell list composed of multiple cells. For another example, the first information includes a session list of the target MBMS and the cell associated with the target terminal, the session list of one target MBMS includes one service identifier and one or more session identifiers. Therefore, the access network device may determine whether the target terminal needs to receive the target MBMS in the corresponding cell according to the first information, and then determine whether the access network device itself needs to receive the target MBMS.

In an implementation, the first information is specifically used to trigger the access network device to page the target terminal for the target MBMS. After receiving the first information, the access network device determines a cell under its own jurisdiction in the first information, and then paging the target terminal in the idle state and/or the target terminal in the in-active state in the determined cell, so as to evoke the target terminal in the idle state and/or the target terminal in the in-active state to establish a communication connection with the core network device through the access network device, and to transfer from the idle state or the in-active state to the connected state. The access network device may determine whether it needs to receive the target MBMS according to a response of the target terminal in the idle state and/or the target terminal in the in-active state to the paging, i.e., according to an evocation situation of the target terminal.

S404, establish a broadcast connection with the access network device for the target MBMS if second information from the access network device or the target terminal is received, where the second information is used to indicate the access network device needs to receive the target MBMS.

In one embodiment, if the core network device receives the second information from the access network device, or the second information sent by the target terminal device through the access network device, it represents that there is the target terminal which is interested in the target MBMS within the cell under the jurisdiction of the access network device, that is, the access network device needs to receive the target MBMS in actual. Therefore, the core network device establishes a broadcast connection with the access network device for the target MBMS, and to transmit the target MBMS through the broadcast connection. The second information is used to indicate that the access network device needs to receive the target MBMS.

In the embodiment of the present application, the core network device determines the target terminal which is interested in the target MBMS, determines the cell associated with the target terminal, sends the first information to the access network device to which the cell belongs to trigger the access network device to determine whether the target MBMS needs to be received, establishes the broadcast connection with the access network device for the target MBMS if the core network device receives the second information from the access network device or the target terminal, and an actual requirement of the access network device for the target MBMS is fully considered in a target MBMS transmission, and to improve a flexibility of MBMS transmission and improve a utilization efficiency of the network resources.

In some embodiments, tracking area information of the terminal device is pre-stored in the core network device, where the tracking area information includes one or more cells. When the target terminal includes the target terminal in the idle state, the core network device may obtain the pre-stored tracking area information of the target terminal in the idle state. For each target terminal in the idle state, the cell in the tracking area information of the target terminal is determined as the cell associated with the target terminal, to improve an accuracy of a determining process of the cell associated with the target terminal in the idle state.

In the embodiment, the tracking area information includes one or more cells, which means that the tracking area information includes a name, a geographic location and/or an identifier of one or more cells, each terminal device may correspond to one piece of tracking area information, the cell in the tracking area information is the cell where the terminal device is often located. When the target terminal is in the idle state, the core network device cannot know the cell where the target terminal is located. Therefore, the pre-stored tracking area information of the target terminal in the idle state can be obtained, and one or more cells in the tracking area information of the target terminal in the idle state are determined as the cells associated with the target terminal in the idle state.

In an implementation, the tracking area information of the target terminal is a tracking area identity (TAI) or a tracking area identity list (TAI list) of the target terminal, where the TAI is the tracking area identity in an LTE system, which is unique in the world and used for location management of the terminal device. Each cell belongs to only one tracking area. Therefore, according to the TAI of the target terminal, the cell associated with the target terminal is determined, and the accuracy of the determining process of the access network device is improved.

In some embodiments, for the target terminal in the connected state and/or the target terminal in the in-active state, the core network device may obtain the cell where the pre-stored target terminal is located, and the cell where the pre-stored target terminal is located is determined as the cell associated with the target terminal.

In the embodiment, the core network device may obtain the cell where the target terminal in the connected state is located through the access network device in real time. The target terminal in the in-active state is equivalent to being in a sleep state for the core network device to save a power and traffic of the target terminal. In a historical time, the core network device may save the cell where the target terminal in the in-active state transfers to the connected state. Therefore, the core network device may obtain the cell where the pre-stored target terminal in the in-active state is located. After the cell where the target terminal is located is obtained, the cell where the target terminal is located may be determined as a cell associated with the target terminal.

Figure 5:
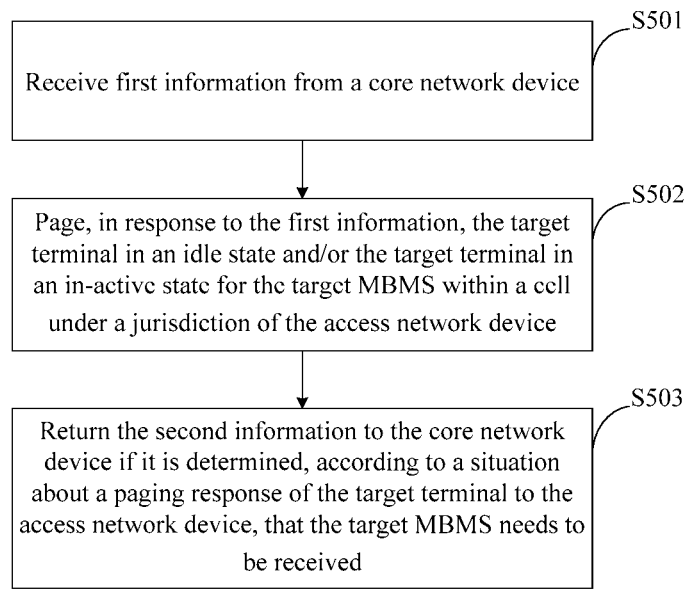
FIG. 5 is a flowchart of a multimedia broadcast multicast service transmission method according to another embodiment of the present application.

FIG. 5 shows a schematic flowchart of a multimedia broadcast multicast service transmission method according to another embodiment of the present application. The method in the embodiment may be executed by the access network device. As shown in FIG. 5, the method of the embodiment may include:

S501, receive first information from a core network device.

The first information is used to trigger the access network device to which a cell associated with a target terminal belongs to confirm whether the target MBMS needs to be received, the target terminal is a terminal device interested in the target MBMS. For the description of the first information may refer to the description of the embodiment shown in FIG. 5, which are not repeated here.

S502, page, in response to the first information, the target terminal in an idle state and/or the target terminal in an in-active state for the target MBMS within a cell under a jurisdiction of the access network device.

In the embodiment, after the first information is received, the access network device may determine the cell under its jurisdiction among the cells where the target terminal in the idle state and/or the target terminal in the in-active state may appear in the first information. In the determined cell under its jurisdiction, for the target MBMS, the target terminal in the idle state and/or the target terminal in the in-active state is paged to evoke the target terminal in the idle state and/or in the in-active state which is interested in the target MBMS.

In the embodiment, after paging, the target terminal in the idle state and/or in the in-active state which is interested in the target MBMS will establish a communication connection with the core network device through the access network device for the target MBMS, to receive the target MBMS from the core network device. Therefore, the access network device may determine whether the target MBMS needs to be received according to a situation about a paging response of the target terminal to the access network device.

In a possible implementation, if the access network device receives a connection message for the target MBMS from the target terminal after paging, the access network device determines that the target MBMS needs to be received, and returns the second information to the core network device. Otherwise, the access network device determines that the target MBMS does not need to be received, and to improve an accuracy with which the access network device determines whether the target MBMS need to be received.

S503, return the second information to the core network device if it is determined, according to a situation about a paging response of the target terminal to the access network device, that the target MBMS needs to be received.

The second information is used to indicate that the access network device needs to receive the target MBMS.

In the embodiment, the second information is returned to the core network device if it is determined, according to the situation about the paging response of the target terminal to the access network device, that the target MBMS needs to be received, and the core network device knows that the access network device needs to receive the target MBMS according to the second information, and establishes a session of the target MBMS with the access network device.

In the embodiment of the present application, after the first information is received, the access network device pages the target terminal in the idle state and/or the target terminal in the in-active state, determines, according to the situation about the paging response of the target terminal, whether to receive the target MBMS. If the access network device needs to receive the target MBMS, notify the core network device through the second information, and an actual requirement of the access network device for the target MBMS can be fully considered in transmission of the target MBMS, and to improve a flexibility of MBMS transmission and improve a utilization efficiency of the network resources.

Figure 6:
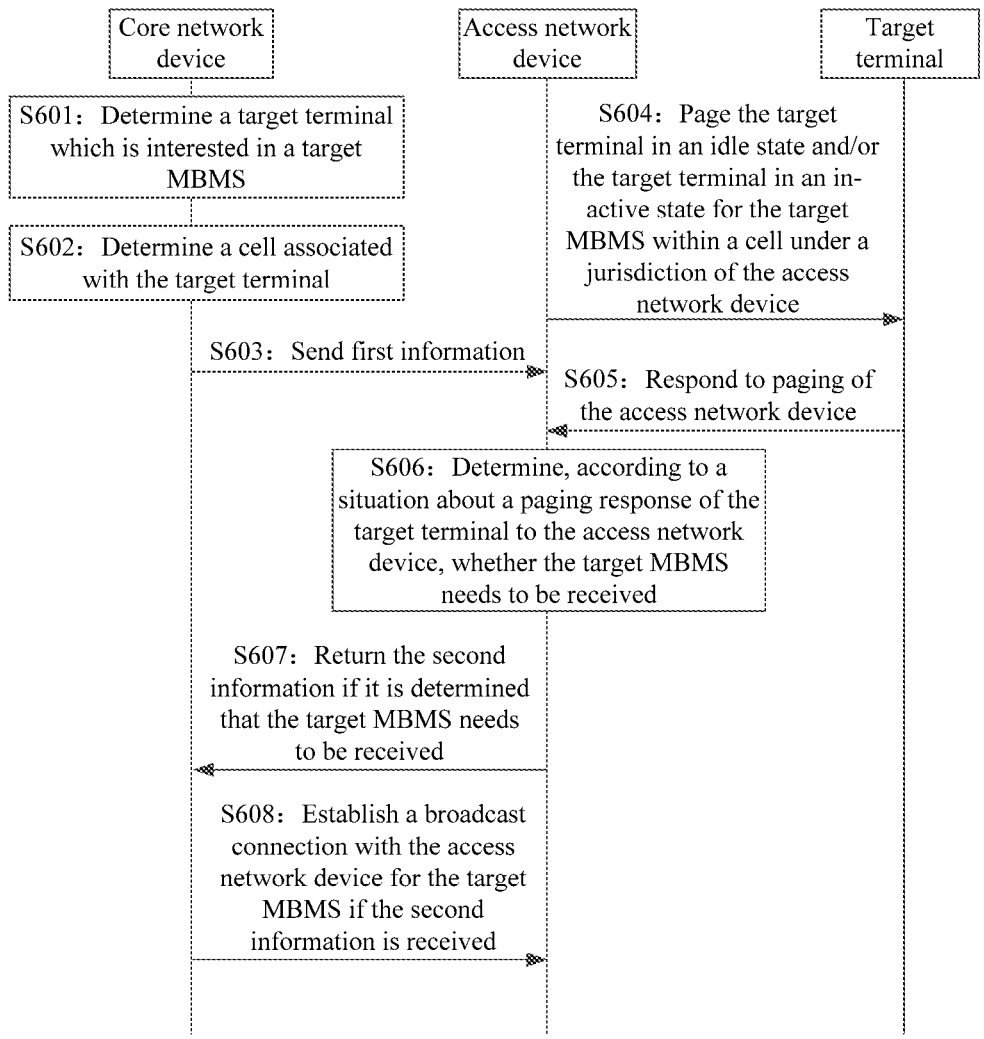
FIG. 6 is a flowchart of a multimedia broadcast multicast service transmission method according to another embodiment of the present application.

Based on the embodiments shown in FIG. 4 and FIG. 5, FIG. 6 is a schematic flowchart of a multimedia broadcast multicast service transmission method according to another embodiment of the present application. FIG. 6 shows an interaction process between a core network device, an access network device and a target terminal. As shown in FIG. 6, the method of the embodiment may include:

S601, the core network device determines a target terminal which is interested in a target MBMS.

S602, the core network device determines a cell associated with the target terminal.

S603, the core network device sends first information to the access network device to which the cell associated with the target terminal belongs.

S604, the access network device pages, in response to the first information, the target terminal in an idle state and/or the target terminal in an in-active state for the target MBMS within a cell under a jurisdiction of the access network device.

S605, the target terminal in the idle state and/or the target terminal in the in-active state responds to paging of the access network device.

S606, the access network device determines, according to a situation about a paging response of the target terminal to the access network device, whether the target MBMS needs to be received.

S607, return the second information to the core network device if the access network device determines that the target MBMS needs to be received.

S608, establish a broadcast connection with the access network device for the target MBMS if the core network device receives the second information.

In the embodiment, for the specific implementation and effects of S601-S608 may refer to the description of the implementation process and effects in the embodiments shown in FIG. 4 and FIG. 5, and which are not repeated here.

Figure 7:
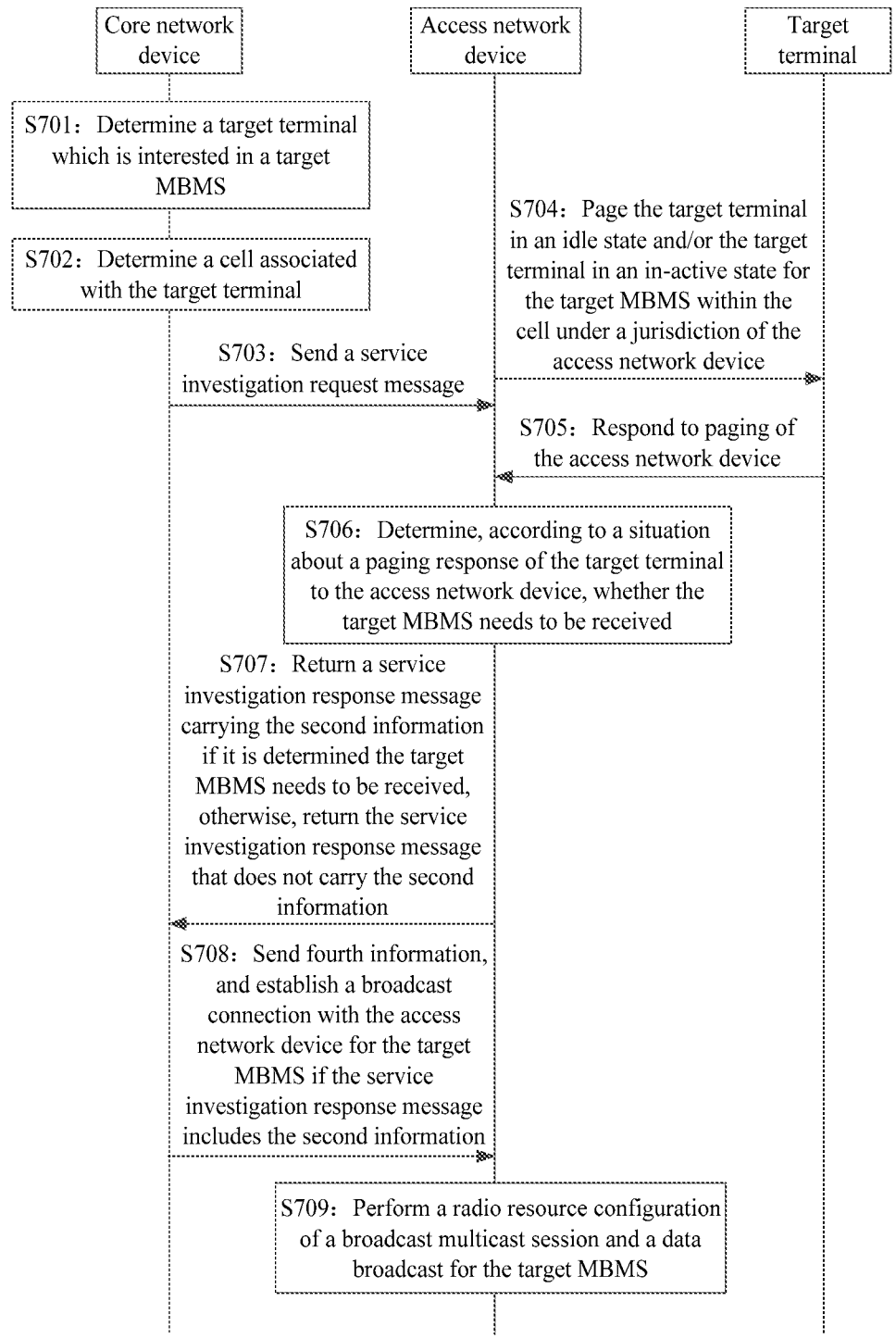
FIG. 7 is a flowchart of a multimedia broadcast multicast service transmission method according to another embodiment of the present application.

FIG. 7 is a schematic flowchart of a multimedia broadcast multicast service transmission method according to another embodiment of the present application. FIG. 7 shows an interaction process between a core network device, an access network device and a target terminal. As shown in FIG. 7, the method of the embodiment may include:

S701, the core network device determines a target terminal which is interested in a target MBMS.

S702, the core network device determines a cell associated with the target terminal.

S703, the core network device sends a service investigation request message to the access network device to which the cell associated with the target terminal belongs.

The service investigation request message includes first information, the service investigation request message is used to investigate whether the access network device needs to receive the target MBMS.

S704, the access network device pages, in response to the service investigation request message from the core network device, the target terminal in an idle state and/or the target terminal in an in-active state for the target MBMS within the cell under a jurisdiction of the access network device.

In the embodiment, after receiving the service investigation request message, the access network device may page, according to the first information in the service investigation request message, the target terminal in the idle state and/or the target terminal in the in-active state for the target MBMS within the cell under the jurisdiction of the access network device.

S705, the target terminal in the idle state and/or the target terminal in the in-active state responds to paging of the access network device.

S706, the access network device determines, according to a situation about a paging response of the target terminal to the access network device, whether the target MBMS needs to be received.

S707, return a service investigation response message carrying the second information to the core network device if the access network device determines that the target MBMS needs to be received, otherwise, return the service investigation response message that does not carry the second information.

The service investigation response message returned by the access network device to the core network device is used to feed back to the core network device whether the access network device needs to receive the target MBMS.

S708, the core network device sends fourth information to the access network device and establishes a broadcast connection with the access network device for the target MBMS if the service investigation response message includes the second information.

The fourth information is used to indicate a session establishment of the target MBMS.

In the embodiment, the core network device sends the fourth information to the access network device and establishes the broadcast connection with the access network device for the target MBMS if the service investigation response message includes the second information, and to perform a session of the target MBMS with the access network device.

In an implementation, the broadcast connection for the target MBMS is the broadcast connection based on an N3 interface-based between the SMF entity and the access network device.

S709, the access network device performs, in response to the fourth information, a radio resource configuration of a broadcast multicast session and a data broadcast for the target MBMS.

In the embodiment, the access network device performs, in response to the fourth information, the radio resource configuration of the broadcast multicast session and the data broadcast for the target MBMS. The performing the radio resource configuration of the broadcast multicast session may be, for example, by allocating and modulating radio transmission and a network resource, ensures a synchronization and a signal quality of the session of the target MBMS received by different target terminals.

Implementation contents of the steps in the embodiments of the present application may refer to the description of the corresponding steps or operations in the above-mentioned method embodiments, repetitions are not repeated herein.

In the embodiment of the present application, the core network device investigates whether the access network device to which the cell associated with the target terminal belongs needs to receive the target MBMS through a service investigation manner, the access network device returns a result to the core network device through a service investigation response manner. In the transmission of the target MBMS, an actual requirement of the access network device for the target MBMS is fully considered, and to improve a flexibility of MBMS transmission and improve a utilization efficiency of the network resources.

Figure 8:
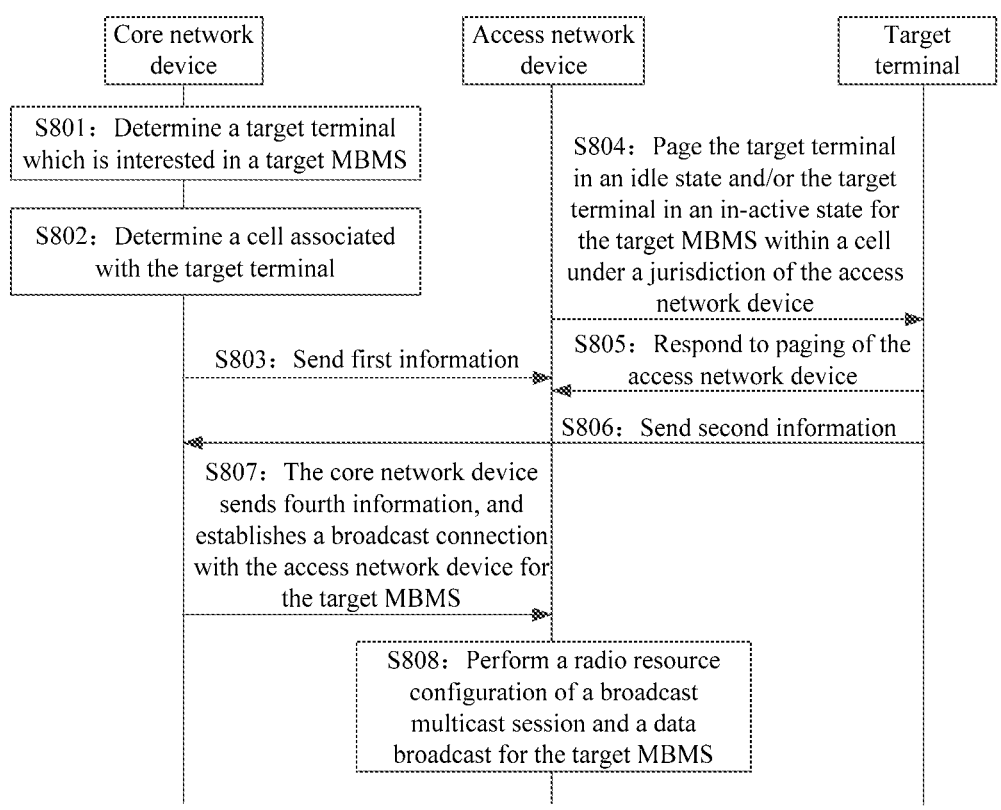
FIG. 8 is a flowchart of a multimedia broadcast multicast service transmission method according to another embodiment of the present application.

FIG. 8 is a schematic flowchart of a multimedia broadcast multicast service transmission method according to another embodiment of the present application. FIG. 8 shows an interaction process between a core network device, an access network device and a target terminal. As shown in FIG. 8, the method of the embodiment may include:

S801, the core network device determines a target terminal which is interested in a target MBMS.

S802, the core network device determines a cell associated with the target terminal.

S803, the core network device sends first information to the access network device to which the cell associated with the target terminal belongs.

S804, the access network device pages, in response to the first information from the core network device, the target terminal in an idle state and/or the target terminal in an in-active state for the target MBMS within the cell under a jurisdiction of the access network device.

In an implementation, the core network device sends a service investigation request message to the access network device to investigate whether the access network device needs to receive the target MBMS. After receiving the service investigation message, the access network device may return a service investigation confirmation message to the core network device to indicate that the access network device has received the service investigation request message from the core network device, and page the target terminal at the same time. The service investigation confirmation message does not include an investigation result, the service investigation request message includes the first information.

S805, the target terminal in the idle state and/or the target terminal in the in-active state responds to paging of the access network device.

S806, after responding to the paging of the access network device, the target terminal in the idle state and/or the target terminal in the in-active state sends the second information to the core network device.

In the embodiment, after being paged, the target terminal in the idle state and/or the target terminal in the in-active state will establish a communication connection with the core network device through the access network device for the target MBMS to receive the target MBMS from the core network device. Therefore, after the target terminal in the idle state and/or the target terminal in the in-active state establishes the communication connection with the core network device through the access network device for the target MBMS, the second information may be sent to the core network device, where a relevant content of the second information may refer to the relevant descriptions of the above-mentioned method embodiments.

In an implementation, the target terminal may send the second information to the core network device by sending a non-access stratum (NAS) message to the core network device, where the second information is carried in the NAS message. Or, the target terminal may establish a protocol data unit (PUD) session with the core network device, and send the second information to the core network device through the PUD session.

S807, the core network device sends fourth information to the access network device and establishes a broadcast connection with the access network device for the target MBMS in response to the received second information.

S808, the access network device performs, in response to the fourth information, a radio resource configuration of a broadcast multicast session and a data broadcast for the target MBMS.

Implementation contents of the steps in the embodiments of the present application may refer to the description of the corresponding steps or operations in the above-mentioned method embodiments, repetitions are not repeated herein.

In the embodiment of the present application, the core network device investigates whether the access network device to which the cell associated with the target terminal belongs needs to receive the target MBMS through a service investigation manner, the access network device returns a result to the core network device through a service investigation response manner. In the transmission of the target MBMS, an actual requirement of the access network device for the target MBMS is fully considered, and to improve a flexibility of MBMS transmission and improve a utilization efficiency of network resources.

Figure 9:
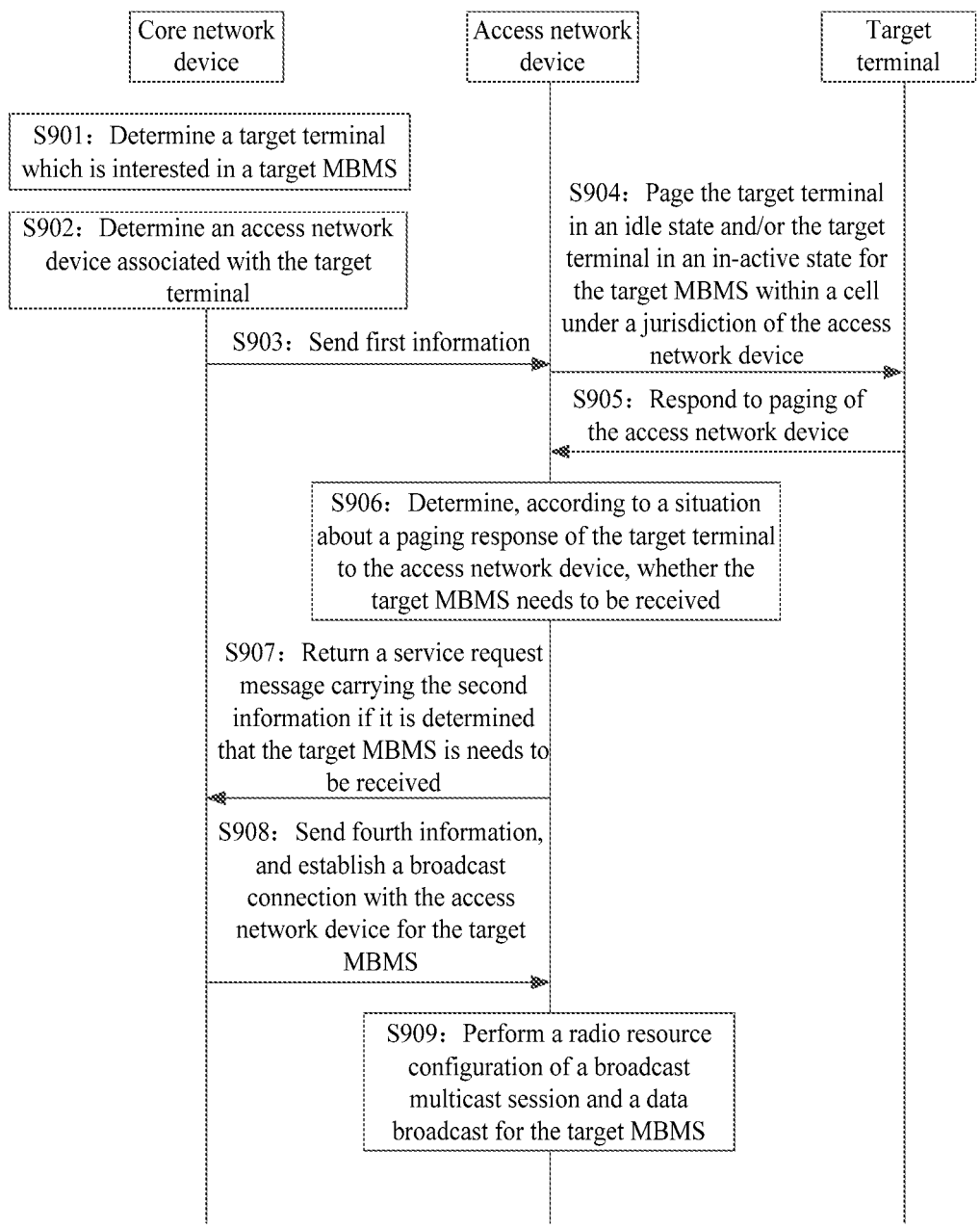
FIG. 9 is a flowchart of a multimedia broadcast multicast service transmission method according to another embodiment of the present application.

FIG. 9 is a schematic flowchart of a multimedia broadcast multicast service transmission method according to another embodiment of the present application. FIG. 9 shows an interaction process between a core network device, an access network device and a target terminal. As shown in FIG. 9, the method of the embodiment may include:

S901, the core network device determines a target terminal which is interested in a target MBMS.

The target terminal includes the target terminal in a connected state and/or the target terminal in an in-active state.

S902, the core network device determines a cell associated with the target terminal.

S903, the core network device sends first information to the access network device to which the cell associated with the target terminal belongs.

The first information is used to trigger the access network device to page the target terminal in the in-active state for the target MBMS and to indicate a session establishment of the target MBMS.

In the embodiment, since the target terminal includes the target terminal in the connected state and/or the target terminal in the in-active state, the core network device determines that the access network device to which the cell associated with the target terminal in the connected state belongs need to receive the target MBMS, and the access network device to which the cell associated with the target terminal in the in-active state belongs has a high probability of evoking the target terminal in the in-active state. Therefore, the core network device can directly send the first information that can be used to indicate the session establishment of the target MBMS to the access network device, and to improve a session establishment efficiency of the target MBMS.

S904, the access network device pages, in response to the first information from the core network device, the target terminal in the in-active state for the target MBMS within the cell under a jurisdiction of the access network device.

S905, the target terminal in the idle state and/or the target terminal in the in-active state responds to paging of the access network device.

S906, the access network device determines, according to a situation about a paging response of the target terminal to the access network device, whether the target MBMS needs to be received.

S907, the access network device returns a service request message carrying the second information to the core network device if it is determined that the target MBMS needs to be received.

In the embodiment, the service request message is used to indicate the core network device to continue the session establishment process of the target MBMS.

In an implementation, the service request message further includes location information of the target terminal that responds to the paging of the access network device. In a possible implementation, updating, according to the location information of the target terminal that responds to the paging of the access network device in the service request message, the pre-stored cell where the target terminal that responds to the paging of the access network device is located, to improve an accuracy of the stored cell where the target terminal in the in-active state is located, and improving an accuracy of a confirmation process of the access network device to which the cell associated with the target terminal belongs. The location information of the target terminal may include a geographical position of the target terminal and/or a geographical position of the cell where the target terminal is located.

S908, the core network device sends fourth information to the access network device, and establishes a broadcast connection with the access network device for the target MBMS, in response to the service request message received from the access network device.

S909, the access network device performs a radio resource configuration of a broadcast multicast session and a data broadcast for the target MBMS in response to the fourth information.

Implementation contents of the steps in the embodiments of the present application may refer to the description of the corresponding steps or operations in the above-mentioned method embodiments, repetitions are not repeated herein.

In the embodiment of the present application, the core network device indicates the access network device to page the target terminal in the in-active state, and indicates the access network device to establish a session of a target MBMS through the first information. The access network device notifies the core network device to continue a target MBMS session by returning a service request message, in the transmission of the target MBMS, an actual requirement of the access network device for the target MBMS is fully considered, and to improve a flexibility of MBMS transmission, improve a utilization efficiency of the network resources, and ensure the efficiency of the MBMS transmission.

Figure 10:
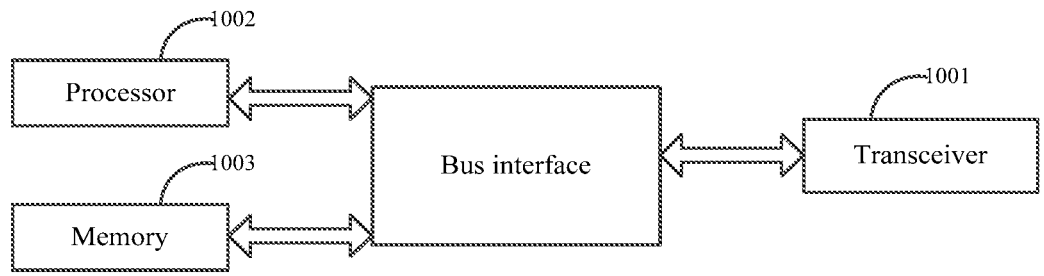
FIG. 10 is a schematic diagram of a core network device according to an embodiment of the application.

An embodiment of the present application provides a core network device. As shown in FIG. 10, the core network device in the embodiment may be a network device, the core network device includes a transceiver 1001, a processor 1002 and a memory 1003.

The transceiver 1001 is configured to receive and transmit data under a control of the processor 1002.

In FIG. 10, a bus architecture may include any number of interconnected buses and bridges, in one embodiment, one or more processors represented by the processor 1002 and various circuits of the memory represented by the memory 1003 are linked together. The bus architecture may also link various other circuits together, such as peripherals, voltage regulators, and power management circuits, which are well known in the art and, therefore, will not be described further herein. Bus interface provides an interface. The transceiver 1001 may be multiple elements, i.e., including a transmitter and a receiver, providing elements for communicating with various other apparatuses over transmission media, the transmission media includes wireless channels, wired channels, fiber optic cables, and the like. The processor 1002 is responsible for managing the bus architecture and general processing, the memory 1003 may store data used by the processor 1002 in performing operations.

The processor 1002 may be a central processing unit (CPU), an application specific integrated circuit (ASIC), a field programmable gate array (FPGA) or a complex programmable logic device (CPLD), the processor 1002 may also adopt a multi-core architecture. The processor 1002 and the memory 1003 may also be arranged physically separately.

The processor 1002 is configured to perform the following operations according to obtained executable instructions by calling computer programs stored in the memory 1003:
  determining a target terminal which is interested in a target multimedia broadcast multicast service MBMS;
  determining a cell associated with the target terminal;
  sending first information to an access network device to which the cell belongs, where the first information is used to trigger the access network device to confirm whether the target MBMS needs to be received; and
  establishing a broadcast connection with the access network device for the target MBMS if second information from the access network device or the target terminal is received, where the second information is used to indicate the access network device needs to receive the target MBMS.

In an implementation, before the determining the target terminal which is interested in the target multimedia broadcast multicast service MBMS, the processor 1002 is further configured to:
  receive third information from a session management function SMF entity, where the third information includes an identifier of the target MBMS, the third information is used to indicate a session start of the target MBMS.

In an implementation, the processor 1002 is configured to:
  determine, according to a preset corresponding relationship between a terminal device and the MBMS and the third information, the target terminal which is interested in the target MBMS.

In an implementation, the processor 1002 is further configured to:
  obtain pre-stored tracking area information of the target terminal in an idle state, where the tracking area information includes one or more cells.

In an implementation, the processor 1002 is further configured to:
  obtain a pre-stored cell where the target terminal in an in-active state is located and/or where the target terminal in a connected state is located.

In an implementation, the first information is specifically used to trigger the access network device to page the target terminal in an idle state and/or page the target terminal in an in-active state for the target MBMS.

In an implementation, the processor 1002 is further configured to:
  send a service investigation request message to the access network device, where the service investigation request message includes the first information, and the service investigation request message is used to investigate whether the access network device needs to receive the target MBMS;
  receive a service investigation response message from the access network device if the service investigation response message includes the second information, send fourth information to the access network device, and establish the broadcast connection with the access network device for the target MBMS, where the fourth information is used to indicate a session establishment of the target MBMS.

In an implementation, the processor 1002 is further configured to:
send fourth information to the access network device, and establish the broadcast connection with the access network device for the target MBMS, if the second information from the target terminal is received, where the fourth information is used to indicate a session establishment of the target MBMS.

In an implementation, the second information is carried in a non-access layer message from the target terminal.

In an implementation, the first information is used to indicate a session establishment of the target MBMS and trigger the access network device to page the target terminal in an in-active state for the target MBMS, the processor 1002 is further configured to:
send fourth information to the access network device and establish the broadcast connection with the access network device for the target MBMS if a service request message from the access network device is received, where the service request message includes the second information, and the fourth information is used to indicate the session establishment of the target MBMS.

In an implementation, the service request message further includes location information of the target terminal that responds to a paging of the access network device, and the processor is further configured to perform the following operations:
updating, according to the location information of the target terminal that responds to the paging of the access network device, a pre-stored cell where the target terminal that responds to the paging of the access network device is located.

It should be noted here that the above-mentioned apparatus provided by the present application can implement all the method steps implemented by the core network device in the above-mentioned method embodiments, and can achieve the same technical effect. The same parts and beneficial effects in the embodiment as those in the method embodiments will not be repeated herein.

Figure 11:
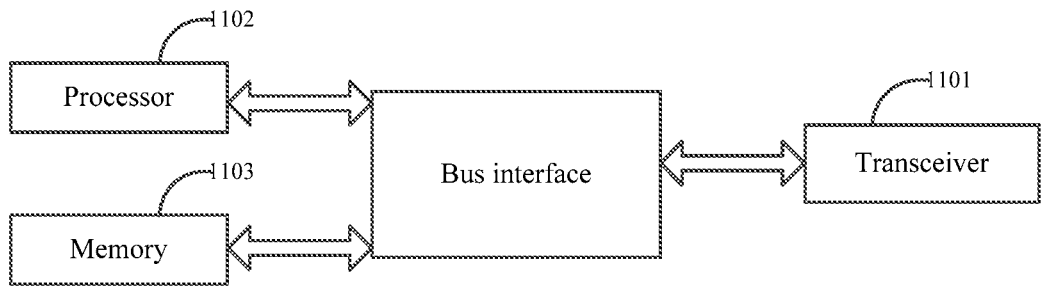
FIG. 11 is a schematic diagram of an access network device according to an embodiment of the application.

An embodiment of the present application provides an access network device. As shown in FIG. 11, the access network device in the embodiment may be a network device, the access network device includes a transceiver 1101, a processor 1102, and a memory 1103.

The transceiver 1101 is configured to receive and send data under a control of the processor 1102.

In FIG. 11, a bus architecture may include any number of interconnected buses and bridges, in one embodiment, one or more processors represented by the processor 1102 and various circuits of the memory represented by the memory 1103 are linked together. The bus architecture may also link various other circuits together, such as peripherals, voltage regulators, and power management circuits, which are well known in the art and, therefore, will not be described further herein. Bus interface provides an interface. The transceiver 1101 may be multiple elements, i.e., including a transmitter and a receiver, providing elements for communicating with various other apparatuses over transmission media, the transmission media includes wireless channels, wired channels, fiber optic cables, and the like. The processor 1102 is responsible for managing the bus architecture and general processing, the memory 1103 may store data used by the processor 1102 in performing operations.

The processor 1102 may be a CPU, an ASIC, an FPGA or a CPLD, the processor 1102 may also adopt a multi-core architecture. The processor 1002 and the memory 1103 may also be arranged physically separately.

The processor 1102 is configured to perform the following operations according to obtained executable instructions by calling computer programs stored in the memory 1103:
receiving first information from a core network device, where the first information is used to trigger the access network device to which a cell associated to a target terminal belongs to confirm whether it needs to receive a target MBMS, and the target terminal is a terminal device interested in the target MBMS;
paging, in response to the first information, the target terminal in an idle state and/or the target terminal in an in-active state for the target MBMS within a cell under a jurisdiction of the access network device; and
returning second information to the core network device if it is determined, according to a situation about a paging response of the target terminal to the access network device, that the target MBMS needs to be received, where the second information is used to indicate that the access network device needs to receive the target MBMS.

In an implementation, the processor 1102 is configured to:
receive a service investigation request message, from the core network device, where the service investigation request message includes the first information;
return a service investigation response message carrying the second information to the core network device, if it is determined, according to the situation about the paging response of the target terminal to the access network device, that the target MBMS needs to be received.

In an implementation, the processor 1102 is further configured to:
receive the second information from the target terminal if it is determined, according to the situation about the paging response of the target terminal to the access network device, that the target MBMS needs to be received, and send the second information from the target terminal to the core network device.

In an implementation, the second information is carried in a non-access layer message from the target terminal.

In an implementation, the first information is used to indicate a session establishment of the target MBMS and trigger the access network device to page the target terminal in an in-active state for the target MBMS, the processor 1102 is further configured to:
send a service request message to the core network device if it is determined, according to the situation about the paging response of the target terminal to the access network device, that the target MBMS needs to be received, where the service request message includes the second information.

In an implementation, the service request message includes location information of a target terminal that responds to the paging of the access network device.

In an implementation, after the returning the second information to the core network device if it is determined, according to the situation about the paging response of the target terminal to the access network device, that the target MBMS needs to be received, the processor 1102 is further configured to:
receive fourth information from the core network device and establish a broadcast connection with the core network device for the target MBMS, where the fourth information is used to indicate a session establishment of the target MBMS; and perform, in response to the fourth information, a radio resource configuration of a broadcast multicast session and a data broadcast for the target MBMS.

In an implementation, the processor 1102 is further configured to:

return the second information to the core network device if a connection message for the target MBMS from the target terminal is received.

It should be noted here that the above-mentioned apparatus provided by the present application can implement all the method steps implemented by the core network device in the above-mentioned method embodiments, and can achieve the same technical effect. The same parts and beneficial effects in the embodiment as those in the method embodiments will not be repeated herein.

Figure 12:
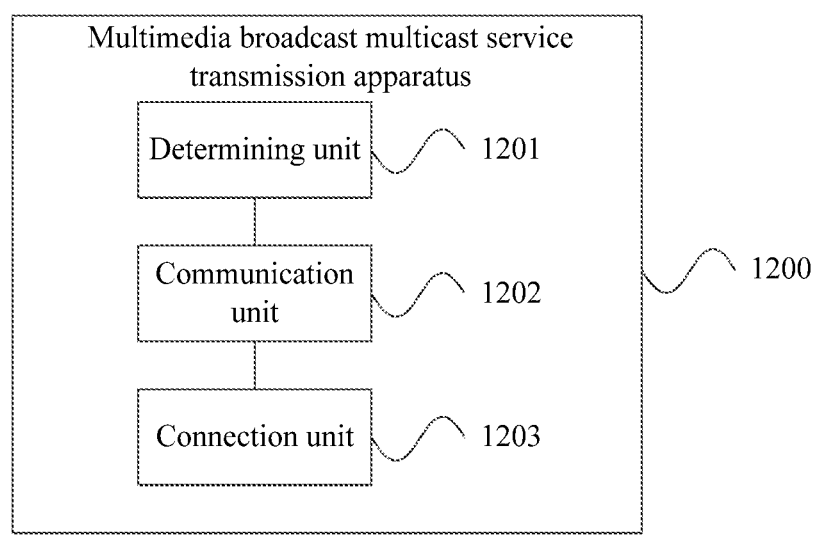
FIG. 12 is a schematic diagram of a multimedia broadcast multicast service transmission apparatus according to an embodiment of the application.

On a side of the core network device, an embodiment of the present application provides a multimedia broadcast multicast service transmission apparatus. As shown in FIG. 12, the multimedia broadcast multicast service transmission apparatus 1200 in the embodiment includes a determining device 1201, a communication device 1202 and a connection device 1203.

The determining device 1201 is configured to determine a target terminal which is interested in a target multimedia broadcast multicast service MBMS, and determine a cell associated with the target terminal;

the communication device 1202 is configured to send first information to an access network device to which the cell belongs, where the first information is used to trigger the access network device to confirm whether the target MBMS needs to be received; and the connecting device 1203, configured to establish a broadcast connection with the access network device for the target MBMS if second information from the access network device or the target terminal is received, where the second information is used to indicate the access network device needs to receive the target MBMS.

In an implementation, before the determining the target terminal which is interested in the target multimedia broadcast multicast service MBMS, the communication device 1202 is further configured to:

receive third information from a session management function SMF entity, where the third information includes an identifier of the target MBMS, and the third information is used to indicate a session start of the target MBMS.

In an implementation, the determining device 1201 is specifically configured to:

determine, according to a preset corresponding relationship between a terminal device and the MBMS and the third information, the target terminal which is interested in the target MBMS.

In an implementation, the determining device 1201 is specifically configured to:

obtain pre-stored tracking area information of the target terminal in an idle state, where the tracking area information includes one or more cells.

In an implementation, the determining device 1201 is specifically configured to:

obtain a pre-stored cell where the target terminal in an in-active state is located and/or where the target terminal in a connected state is located.

In a implementation, the first information is specifically used to trigger the access network device to page the target terminal in an idle state and/or page the target terminal in an in-active state for the target MBMS.

In an implementation, the communication device 1202 is specifically configured to:

send a service investigation request message to the access network device, where the service investigation request message includes the first information, and the service investigation request message is used to investigate whether the access network device needs to receive the target MBMS; and the connection unit 1203 is specifically configured to:

receive a service investigation response message from the access network device if the service investigation response message includes the second information, sending fourth information to the access network device, and establishing the broadcast connection with the access network device for the target MBMS, where the fourth information is used to indicate a session establishment of the target MBMS.

In an implementation, the connection device 1203 is specifically configured to:

send fourth information to the access network device and establishing the broadcast connection with the access network device for the target MBMS if the second information from the target terminal is received, where the fourth information is used to indicate a session establishment of the target MBMS.

In an implementation, the second information is carried in a non-access layer message from the target terminal.

In an implementation, the first information is used to indicate a session establishment of the target MBMS and trigger the access network device to page the target terminal in an in-active state for the target MBMS, the connecting device 1203 is specifically configured to:

send fourth information to the access network device, and establishing the broadcast connection with the access network device for the target MBMS, if a service request message from the access network device is received, where the service request message includes the second information, and the fourth information is used to indicate the session establishment of the target MBMS.

In an implementation, the service request message further includes location information of the target terminal that responds to paging of the access network device, and the multimedia broadcast multicast service transmission apparatus 1200 further includes:

an updating device, configured to update, according to the location information of the target terminal that responds to the paging of the access network device, a pre-stored cell where the target terminal that responds to the paging of the access network device is located.

Figure 13:
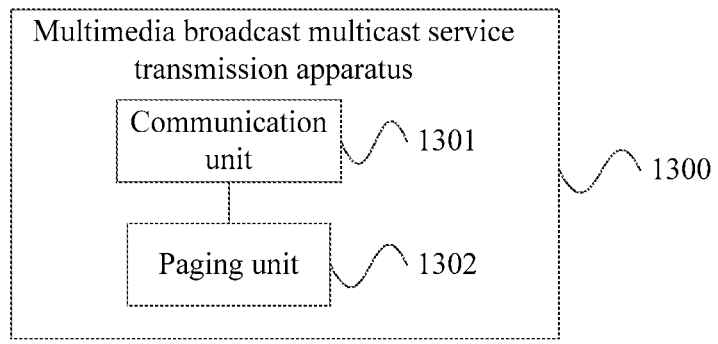
FIG. 13 is a schematic diagram of a multimedia broadcast multicast service transmission apparatus according to another embodiment of the present application.

On a side of the access network device, an embodiment of the present application provides a multimedia broadcast multicast service transmission apparatus. As shown in FIG. 13, the multimedia broadcast multicast service transmission apparatus in the embodiment includes a communication device 1301 and a paging device 1302.

The communication device 1301 is configured to receive first information from a core network device, where the first information is used to trigger the access network device to which a cell associated to a target terminal belongs to confirm whether it needs to receive a target MBMS, and the target terminal is a terminal device interested in the target MBMS;

a paging device 1302, configured to page, in response to the first information, the target terminal in an idle state and/or the target terminal in an in-active state for the target MBMS within a cell under a jurisdiction of the access network device; and the communication device 1301 is further configured to return second information to the core network device if it is determined, according to a situation about a paging response of the target terminal to the access network device, that the target MBMS needs to be received, where the second information is used to indicate that the access network device needs to receive the target MBMS.

In an implementation, the communication device 1301 is specifically configured to:

receive a service investigation request message from the core network device, where the service investigation request message includes the first information;

return a service investigation response message carrying the second information to the core network device, if it is determined, according to the situation about the paging response of the target terminal to the access network device, that the target MBMS needs to be received.

In an implementation, the communication device 1301 is specifically configured to:

receive the second information from the target terminal if it is determined, according to the situation about the paging response of the target terminal to the access network device, that the target MBMS needs to be received, and sending the second information from the target terminal to the core network device.

In an implementation, the second information is carried in a non-access layer message from the target terminal.

In an implementation, the first information is used to indicate a session establishment of the target MBMS and trigger the access network device to page the target terminal in an in-active state for the target MBMS, the communication device 1301 is specifically configured to:

send a service request message to the core network device, if it is determined, according to the situation about the paging response of the target terminal to the access network device, that the target MBMS needs to be received, where the service request message includes the second information.

In an implementation, the service request message includes location information of a target terminal that responds to the paging of the access network device.

In an implementation, after the returning the second information to the core network device, if it is determined, according to the situation about the paging response of the target terminal to the access network device, that the target MBMS needs to be received, the communication device 1301 is further configured to:

receive fourth information from the core network device, and establishing a broadcast connection with the core network device for the target MBMS, where the fourth information is used to indicate a session establishment of the target MBMS; and perform, in response to the fourth information, a radio resource configuration of a broadcast multicast session and a data broadcast for the target MBMS.

In an implementation, the communication device 1301 is specifically configured to:

return the second information to the core network device if a connection message for the target MBMS from the target terminal is received.

It should be noted here that the above-mentioned apparatus provided by the present application can implement all the method steps implemented by the core network device in the above-mentioned method embodiments, and can achieve the same technical effect. The same parts and beneficial effects in the embodiment as those in the method embodiments will not be repeated herein.

It should be noted that the division of devices in the embodiments of the application is illustrative, which is only a logical function division, and in an actual implementation, there may be other division manner. In addition, each functional device in each embodiment of the application may be integrated into a processing device, or each device may exist physically independently, or two or more devices may be integrated into a device. The integrated devices mentioned above may be realized in the form of hardware or software functional devices.

If the above-mentioned integrated device is implemented as a software functional device and sold or used as an independent product, it may be stored in a processor readable storage medium. Based on this understanding, the embodiments of the application, in essence, or the part that contributes to the prior art, or the whole or part of the embodiments, may be embodied in the form of a software product, which is stored in a storage medium, including a number of instructions to enable a computer device (which may be a personal computer, a server, or a network device, etc.) or a processor to execute all or part of the steps of the method described in the various embodiments of the present application. The aforementioned storage media include: a U disk, a mobile hard disk, a read-only memory (ROM), a random access memory (RAM), a magnetic disc or an optical disc and other media that can store program codes.

On a side of the core network device, the embodiment of the present application provides a processor readable storage medium, having computer programs stored thereon, the computer programs are used to enable a processor to execute any of the methods described in the embodiment of the present application related to the core network device, and the processor can implement all the method steps implemented by the core network device in the above-mentioned method embodiments, and can achieve the same effect. The same parts and beneficial effects in the embodiment as those in the method embodiments will not be repeated herein.

On a side of the access network device, the embodiment of the present application provides a processor readable storage medium, having computer programs stored thereon, the computer programs are used to enable a processor to execute any of the methods described in the embodiment of the present application related to the access network device, and the processor can implement all the method steps implemented by the access network device in the above-mentioned method embodiments, and can achieve the same effect. The same parts and beneficial effects in the embodiment as those in the method embodiments will not be repeated herein.

The processor readable storage medium can be any available medium or data storage device that can be accessed by the processor, including but not limited to, a magnetic memory (such as a floppy disk, a hard disk, a tape, a magneto-optical disk (MO), etc.), an optical memory (such as a compact disc (CD), a digital videodisc (DVD), a blu-ray disc (BD), a high-definition versatile disc (HVD), etc.), and a semiconductor memory (such as a ROM, an erasable programmable read-only memory (EPROM), an electrically erasable programmable read-only memory (EEPROM), a non-volatile memory (NAND FLASH), a solid state disk (SSD), etc.).

On the side of the core network device, an embodiment of the present application also provides a computer program product containing instructions, computer programs are stored in a storage medium, at least one processor may read the computer programs from the storage medium, when the computer programs are executed by the at least one processor, all the method steps implemented by the core network device in the above-mentioned method embodiments can be realized, and can achieve the same effect. The same parts and beneficial effects in the embodiment as those in the method embodiments will not be repeated herein.

On the side of access network device, the embodiment of the present application also provides a computer program product containing instructions, computer programs are stored in a storage medium, at least one processor may read the computer programs from the storage medium, when the computer programs are executed by the at least one processor, all the method steps implemented by the access network device in the above-mentioned method embodiments can be realized, and can achieve the same effect. The same parts and beneficial effects in the embodiment as those in the method embodiments will not be repeated herein.

The embodiment of the present application also provides a communication system, including a core network device, an access network device and a terminal device. The core network device is the core network device described in the above-mentioned apparatus embodiments, which can execute all the method steps performed by the core network device in the above-mentioned method embodiments, and can achieve the same effect. The access network device is the access network device described in the above-mentioned apparatus embodiments, which can execute all the method steps performed by the access network device in the above-mentioned method embodiments, and can achieve the same effect. The same parts and beneficial effects in the embodiment as those in the method embodiments will not be repeated herein.

Embodiments of the present application can be provided as methods, systems, or computer program products. Therefore, the present application may take the form of a complete hardware embodiment, a complete software embodiment, or an embodiment combining software and hardware aspects. Furthermore, the present application may take the form of a computer program product implemented on one or more computer usable storage media (including but not limited to a disk memory, an optical memory, etc.) containing computer usable program codes.

The present application is described with reference to a flowchart and/or a block diagram of the method, apparatus, and computer program product according to the embodiments of the present application. It should be understood that each flow and/or block in the flowchart and/or block diagram, and a combination of flow and/or block in the flowchart and/or block diagram can be realized by computer executable instructions. These computer executable instructions may be provided to a processor of a general purpose computer, a special purpose computer, an embedded processor or other programmable data processing devices to generate a machine and instructions executed by a processor of a computer or other programmable data processing devices generate devices for implementing functions specified in one or more flowcharts and/or one or more block diagrams.

These processor executable instructions may also be stored in a processor readable memory that can guide the computer or other programmable data processing devices to work in a specific way, and the instructions stored in the processor readable memory generate a manufacture including an instruction apparatus, the instruction apparatus implements the functions specified in one or more flowcharts and/or one or more block diagrams.

These processor executable instructions may also be loaded onto the computer or other programmable data processing devices to enable a series of operating steps to be executed on the computer or other programmable devices to generate a computer implemented process, and instructions executed on the computer or other programmable devices provide steps for implementing functions specified in a flow or multiple flows in flowcharts and/or a block or multiple blocks in block diagrams.

The invention claimed is:

1. A multimedia broadcast multicast service (MBMS) transmission method, comprising:
   determining, by a core network device, a target terminal which is interested in a target MBMS;
   determining, by the core network device, a cell associated with the target terminal;
   sending, by the core network device, first information to an access network device to which the cell belongs, wherein the first information is used to trigger the access network device to confirm whether the target MBMS needs to be received; and
   establishing, by the core network device, a broadcast connection with the access network device for the target MBMS if second information from the access network device or the target terminal is received, wherein the second information is used to indicate the access network device needs to receive the target MBMS.

2. The method according to claim 1, wherein before the determining, by the core network device, the target terminal which is interested in the target MBMS, the method further comprises:
   receiving, by the core network device, third information from a session management function (SMF) entity, wherein the third information comprises an identifier of the target MBMS, and the third information is used to indicate a session start of the target MBMS.

3. The method according to claim 2, wherein the determining, by the core network device, the target terminal which is interested in the target MBMS comprises:
   determining, by the core network device, according to a preset corresponding relationship between a terminal device and the MBMS and the third information, the target terminal which is interested in the target MBMS.

4. The method according to claim 1, wherein the determining the cell associated with the target terminal comprises:
   obtaining, by the core network device, pre-stored tracking area information of the target terminal in an idle state, wherein the tracking area information comprises one or more cells.

5. The method according to claim 1, wherein the determining, by the core network device, the cell associated with the target terminal comprises:
   obtaining, by the core network device, a pre-stored cell where the target terminal in an in-active state is located and/or where the target terminal in a connected state is located.

6. The method according to claim 1, wherein the first information is specifically used to trigger the access network device to page the target terminal in an idle state and/or page the target terminal in an in-active state for the target MBMS.

7. The method according to claim 1, wherein the sending, by the core network device, the first information to the access network device comprises:

sending, by the core network device, a service investigation request message to the access network device, wherein the service investigation request message comprises the first information, and the service investigation request message is used to investigate whether the access network device needs to receive the target MBMS;

the establishing, by the core network device, the broadcast connection with the access network device for the target MBMS if the second information from the access network device or the target terminal is received comprises:

receiving, by the core network device, a service investigation response message from the access network device if the service investigation response message comprises the second information, sending, by the core network device, fourth information to the access network device, and establishing, by the core network device, the broadcast connection with the access network device for the target MBMS, wherein the fourth information is used to indicate a session establishment of the target MBMS.

8. The method according to claim 1, wherein the establishing, by the core network device, the broadcast connection with the access network device for the target MBMS if the second information is received from the access network device or the target terminal comprises:

sending, by the core network device, fourth information to the access network device and establishing, by the core network device, the broadcast connection with the access network device for the target MBMS if the second information from the target terminal is received, wherein the fourth information is used to indicate a session establishment of the target MBMS.

9. The method according to claim 8, wherein the second information is carried in a non-access layer message from the target terminal.

10. The method according to claim 1, wherein the first information is used to indicate a session establishment of the target MBMS and trigger the access network device to page the target terminal in an in-active state for the target MBMS, the establishing, by the core network device, the broadcast connection with the access network device for the target MBMS if the second information is received from the access network device or the target terminal comprises:

sending, by the core network device, fourth information to the access network device and establishing, by the core network device, the broadcast connection with the access network device for the target MBMS if a service request message from the access network device is received, wherein the service request message comprises the second information, and the fourth information is used to indicate the session establishment of the target MBMS.

11. The method according to claim 10, wherein the service request message further comprises location information of the target terminal that responds to paging of the access network device, the method further comprises:

updating, by the core network device, according to the location information of the target terminal that responds to the paging of the access network device, a pre-stored cell where the target terminal that responds to the paging of the access network device is located.

12. A multimedia broadcast multicast service (MBMS) transmission method, comprising:

receiving, by an access network device, first information from a core network device, wherein the first information is used to trigger the access network device to which a cell associated with a target terminal belongs to confirm whether a target MBMS needs to be received, and the target terminal is a terminal device interested in the target MBMS;

paging, by the access network device, in response to the first information, the target terminal in an idle state and/or the target terminal in an in-active state for the target MBMS within a cell under a jurisdiction of the access network device; and returning, by the access network device, second information to the core network device if it is determined, according to a situation about a paging response of the target terminal to the access network device, that the target MBMS needs to be received, wherein the second information is used to indicate that the access network device needs to receive the target MBMS.

13. The method according to claim 12, wherein the receiving, by the access network device, the first information from the core network device comprises:

receiving, by the access network device, a service investigation request message from the core network device, wherein the service investigation request message comprises the first information;

the returning, by the access network device, the second information to the core network device if it is determined, according to the situation about the paging response of the target terminal to the access network device, that the target MBMS needs to be received comprises:

returning, by the access network device, a service investigation response message carrying the second information to the core network device if it is determined, according to the situation about the paging response of the target terminal to the access network device, that the target MBMS needs to be received.

14. The method according to claim 12, wherein the returning, by the access network device, the second information to the core network device if it is determined, according to the situation about the paging response of the target terminal to the access network device, that the target MBMS needs to be received comprises:

receiving, by the access network device, the second information from the target terminal if it is determined, according to the situation about the paging response of the target terminal to the access network device, that the target MBMS needs to be received, and sending the second information from the target terminal to the core network device.

15. The method according to claim 14, wherein the second information is carried in a non-access layer message from the target terminal.

16. The method according to claim 12, wherein the first information is used to indicate a session establishment of the target MBMS and trigger the access network device to page the target terminal in an in-active state for the target MBMS, the returning, by the access network device, the second information to the core network device if it is determined, according to the situation about the paging response of the target terminal to the access network device, that the target MBMS needs to be received comprises:

sending, by the access network device, a service request message to the core network device if it is determined, according to the situation about the paging response of the target terminal to the access network device, that the target MBMS needs to be received, wherein the service request message comprises the second information.

17. The method according to claim 16, wherein the service request message comprises location information of a target terminal that responds to the paging of the access network device.

18. The method according to claim 12, wherein after the returning, by the access network device, the second information to the core network device if it is determined, according to the situation about the paging response of the target terminal to the access network device, that the target MBMS needs to be received, the method further comprises:
receiving, by the access network device, fourth information from the core network device, and establishing, by the access network device, a broadcast connection with the core network device for the target MBMS, wherein the fourth information is used to indicate a session establishment of the target MBMS; and
performing, by the access network device, in response to the fourth information, radio resource configuration of a broadcast multicast session and a data broadcast for the target MBMS.

19. The method according to claim 12, wherein the returning, by the access network device, the second information to the core network device if it is determined, according to the situation about the paging response of the target terminal to the access network device, that the target MBMS needs to be received comprises:
returning, by the access network device, the second information to the core network device if a connection message for the target MBMS from the target terminal is received.

20. A core network device, comprising a memory, a transceiver and a processor:
the memory is configured to store computer programs;
the transceiver is configured to receive and transmit data under a control of the processor;
the processor is configured to read the computer programs in the memory and execute the following operations:
determining a target terminal which is interested in a target multimedia broadcast multicast service (MBMS);
determining a cell associated with the target terminal;
sending first information to an access network device to which the cell belongs, wherein the first information is used to trigger the access network device to confirm whether the target MBMS needs to be received; and
establishing a broadcast connection with the access network device for the target MBMS if second information from the access network device or the target terminal is received, wherein the second information is used to indicate the access network device needs to receive the target MBMS.

* * * * *